United States Patent [19]

Storz

[11] 4,441,599

[45] Apr. 10, 1984

[54] FLUID CLUTCH

[75] Inventor: Werner Storz, Benningen, Fed. Rep. of Germany

[73] Assignee: Suddeutsche Kuhlerfabrik Julius Fr. Behr GmbH & Co. KG, Fed. Rep. of Germany

[21] Appl. No.: 313,506

[22] Filed: Oct. 21, 1981

[30] Foreign Application Priority Data

Nov. 6, 1980 [DE] Fed. Rep. of Germany ....... 3041793

[51] Int. Cl.³ .................... F16D 35/00; F16D 43/25
[52] U.S. Cl. ................................. 192/58 B; 192/82 T
[58] Field of Search .......................... 192/58 B, 82 T; 137/112, 113

[56] References Cited

U.S. PATENT DOCUMENTS

| | | | |
|---|---|---|---|
| 3,444,881 | 5/1969 | Harper | 137/112 |
| 4,086,989 | 5/1978 | Spence | 192/58 B |
| 4,278,158 | 7/1981 | Martin | 192/58 B |
| 4,319,715 | 3/1982 | Garda et al. | 137/112 |

FOREIGN PATENT DOCUMENTS 2750289 5/1978 Fed. Rep. of Germany .

Primary Examiner—Rodney H. Bonck
Assistant Examiner—James J. Merek
Attorney, Agent, or Firm—Craig & Burns

[57] ABSTRACT

A fluid clutch composed of a primary part with a drive disc and rotatably mounted relative to a secondary part with a cover is constructed so that the drive disc is disposed in a working chamber formed in the secondary part, the working chamber communicating through a return channel with a supply chamber formed in the secondary part for returning the clutch fluid from the working chamber to the supply chamber by action of a retarder provided in a gap between the circumference of the drive disc and a radial boundary of the working chamber. A control element disposed in a control chamber is displaced axially relative to the drive disc and is located in the secondary part. In accordance with a preferred embodiment, two bores are provided at an angle extending radially and circumferentially relative to the drive disc and control chamber, which bores terminate in the vicinity of the circumferential ends of the retarder in the gap between the drive disc and radial boundary of the working chamber, as well as in the control chamber. Movement of the control element within the control chamber exposes a return channel extending from the control chamber to the supply chamber and alternately exposes and blocks a respective one of the two bores, depending upon the direction of rotation of the drive disc.

14 Claims, 4 Drawing Figures

FLUID CLUTCH

BACKGROUND OF THE INVENTION

The invention relates to a fluid clutch, composed of a primary part with a drive disc and a secondary part with a cover. Included are primary and secondary parts mounted to be rotatable with respect to one another, wherein the drive disc is located in a working chamber formed in the secondary part. The working chamber communicates via a return channel with a supply chamber, likewise located in the secondary part, for returning the clutch fluid, whereby the return of the clutch fluid takes place from the space left between an axial circumferential surface of the drive disc and a radial bordering surface of the working chamber. Retarders for increasing the return pressure as well as a control element are provided thereby making possible the return, depending on the rotational direction, of the drive disc.

Such fluid clutches, also known as viscosity clutches, are known in many embodiments. The torque between the clutch parts is transmitted with zero wear by a highly viscous fluid without the clutch parts coming in contact. Depending on the quantity of the clutch fluid, which provides the torque transmission between the drive disc and the working chamber, the clutch action of the primary and secondary parts takes place with different transmission factors. The quantity of clutch fluid in the working chamber, hereinafter referred to as the working fluid, is controlled in known designs in such a way that, for example, a valve bore is provided in one wall, which divides the interior of the clutch into a working chamber and a supply chamber. Depending on the operating conditions, this valve bore is open to a greater or lesser extent, thus permitting the clutch fluid in the supply chamber to be transferred to the working chamber. In order to be able to bring the working fluid from the working chamber back into the supply chamber, known methods provide retarders which retard the working fluid in the vicinity of the circumference of the drive disc, and return it to the supply chamber via a return channel. These retarders can be mounted either on the cover or on the drive disc. In any case, corresponding recesses must be provided either in the cover or on the drive disc, made, for example, in the form of annular grooves, in order to achieve the desired effect.

In addition to retarders, which act in only one rotary direction, other types are known which are suitable for application in clutches which can operate in both rotational directions. A system of this kind, which is suitable for returning the working fluid from both rotary directions of the drive disc relative to the secondary part is known from German Offenlegungsschrift No. 27 50 289. Two elevations on the cover of the secondary part are provided as retarders, which do not extend over the full width of the drive disc in the axial direction and enclose an inner chamber in which an axially directed valve roller is mounted. An opening to the return channel is provided in the middle of this interior chamber. The roller can be displaced in the chamber depending on the direction in which it is influenced in such a way that it acts in one rotational direction or the other either as a retarder or a control element. Its circumference abuts the outer edge of the drive disc as well as the inner edge of the space formed between the elevations. The disadvantage of this arrangement is that the roller is subjected to considerable wear because of the frictional contact. The continuous friction between the outer surface of the drive disc and the roller itself produces a reduction of its diameter, so that, after a certain amount of time, the retarding function of the roller deteriorates. As a result, the required quantity of working fluid is no longer pumped from the working chamber into the supply chamber. The roller, therefore, cannot act reliably as a retarder and control element.

SUMMARY AND OBJECTS OF THE INVENTION

With the above in mind, a principal object of the present invention is to provide a fluid clutch wherein the return of the working fluid from the working chamber to the supply chamber can be accomplished reliably without wear phenomena involving the components necessary therefor. A further object is to provide a fluid clutch wherein the working fluid can be "pumped" almost completely out of the working chamber.

In accordance with a preferred embodiment of the invention, control elements are disposed in a control chamber adapted to the dimensions of the control elements, said chamber being mounted axially and displaced, by an amount relative to the vertical plane, through the drive disc at the level of the axial circumference of the drive disc in a secondary part. Two bores are provided diagonally with respect to this vertical plane, which terminate in the vicinity of the ends of a retarder in a space left between the drive disc and the radial boundary surface of the working chamber, as well as in the control chamber, and a return channel terminates in the control chamber. Thus, the retarder accumulates the working fluid on the axial circumferential surface of the drive disc and ensures that the working fluid, depending on the rotational direction, is guided into a bore which terminates in the vicinity of the ends of the retarder. The working fluid then reaches the control chamber in which the control element is located, which then, when the return channel is suitably designed, opens to permit the working fluid to pass through it to the supply chamber. Since two bores are provided, both of which terminate in the control chamber, the working fluid can be pumped out in both rotary directions of the drive disc with respect to the secondary part. The retarder can be mounted in a fixed position above the axial circumferential surface of the drive disc without touching the latter, and the control element is, therefore, not exposed to any friction and is characterized by a very long lifetime.

The radial boundary of the working chamber can be provided by a surface of a collar which projects radially inward, said collar being designed on the cover of the secondary part to point in the axial direction. During installation, this collar, therefore, is installed above the outer surface of the drive disc. The retarder can then be made advantageously as a projection, pointing radially inward, with a certain length in the circumferential direction, running on the inwardly pointing surface of the collar. It can, thus, be made integral with the cover, something which is very easy to do. The movable pump slots on the drive disc, which are provided in other designs as retarders, can, therefore, be eliminated.

In a very advantageous embodiment of the invention, provision is made for making the control chamber symmetrical with respect to the midpoint of the retarder, with a length which is shorter in the circumferential direction than the retarder itself. Since, according to the invention, the control chamber is also located so that it is axially displaced with respect to the retarder, the bores which connect the outer space of the working chamber with the control chamber lead into the control chamber, forming an acute angle with the vertical plane through the disc. Hence, the working fluid need not be deflected through an angle of 90° in order to escape from the working chamber. Its acceleration in the circumferential direction, produced by the rotation of the drive shaft, can be utilized to conduct the working fluid into the bores, and, therefore, the working chamber can be emptied nearly completely.

It is favorable for a roller to be provided as the control element. The roller can be installed in the control chamber, adjusted to suit the dimensions of the roller, and there, depending on the rotational direction of the pressure which the working fluid exerts upon the roller, be brought into a position in which it covers the opening of the other bore in the control chamber. In this way, the working fluid, which has entered the control chamber, can be reliably prevented from passing through the second bore into the working chamber again, but passes instead through an opening in the return channel, likewise terminating in the control chamber, into the channel and, thence, into the supply chamber.

The roller can be mounted with its axis in the radial direction pointing into the control chamber, thus producing the advantage that the control chamber can be made with a relatively narrow width, but one which is so set that it is slightly larger than the diameter of the roller. This permits the roller to move freely between the sides which limit the control chamber in the circumferential direction, and move into the corresponding position depending on the direction of rotation. It is also favorable for the end surfaces of the control chamber, which point in the circumferential direction, to be made semicircular, since the roller can then reliably seal off whichever bores terminate in the control chamber in this area.

These and further objects, features and advantages of the Present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
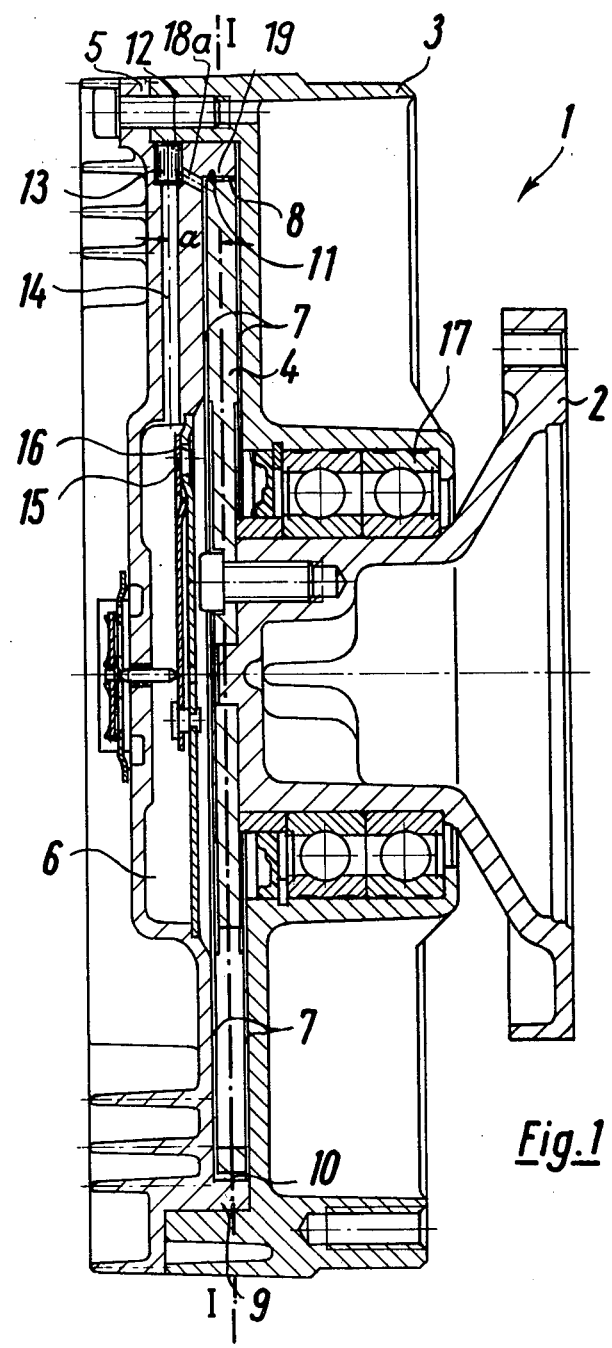
FIG. 1 is a cross section through a fluid clutch according to a preferred embodiment of the invention.

In FIG. 1, a fluid clutch, shown in cross section, is designated generally by the numeral 1, said clutch being shown simplified to the extent that the control mechanism, which regulates the admittance of the working fluid into the working chamber, is omitted. The theoretical design of such a clutch, shown in FIG. 1, is composed of a primary part 2 and a secondary part 3, which are rotatably mounted with respect to one another by a bearing 17. Primary part 2 comprises drive disc 4, which rotates in a working chamber 7 that is partially formed by secondary part 3. Cover 5, associated with secondary part 3, has a collar 9 formed thereon, pointing in an axial direction, whose surface 10, pointing radially inward, constitutes the radial closure of working chamber 7. A supply chamber 6 is also formed in cover 5 of secondary part 3. The influx control 15 (shown schematically) exposes at least one bore 16, so that the working fluid can enter the working chamber. Depending on how much working fluid is in the working chamber, torques of different magnitudes can be transmitted. In order to be able to pump the working fluid out of working chamber 7 once again, retarders are mounted in the vicinity of the axial circumferential surface 11 on the drive disc, said retarders retarding the working fluid, which is located on the axial circumferential surface 11 of the drive disc, and causing the working fluid to go back into the supply chamber through a return channel 14. According to the invention, this is accomplished in the clutch shown in FIG. 1 by virtue of the fact that an elevation, pointing inward in the radial direction, is provided on collar 9, said elevation being designated 19 in FIG. 1 and acting as a retarder. The working fluid passes through bore 18a (or 18b) into a control chamber 12, wherein control element 13 is located. Control chamber 12 is displaced by a distance a in the axial direction relative to a vertical plane I—I of the drive disc, to the level of the axial circumferential surface 11 in cover 5.

Figure 2:
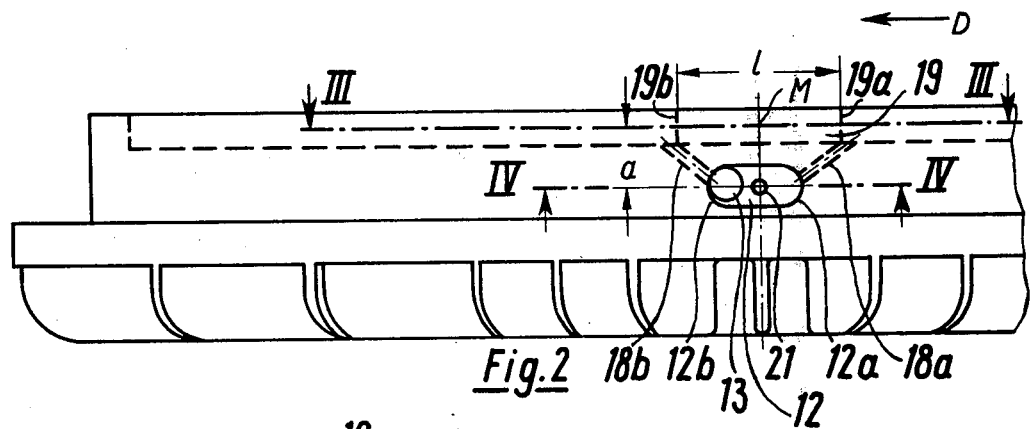
FIG. 2 is a top view of the area in which the return takes place.
Figure 3:
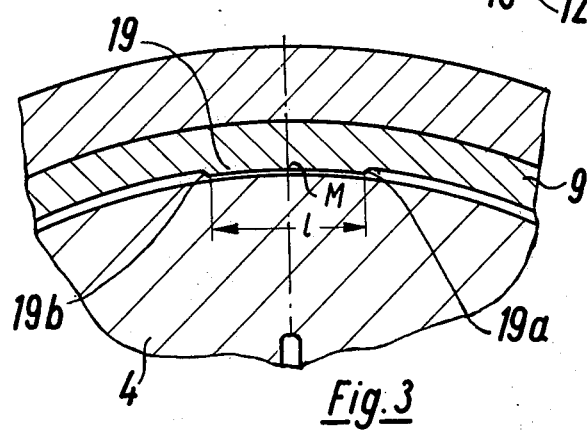
FIG. 3 is a lengthwise section along vertical plane III—III in FIG. 2.

From the top view of cover 5 in the area in which control chamber 12 and retarder 19 are located, shown in FIG. 2, it can be seen that the two bores 18a and 18b run from the space designated 8 in FIG. 1, between circumferential surface 11 of the drive disc and the radially-inward-pointing surface 10 of the collar, to the control chamber. Retarder 19 extends circumferentially for a certain length l (FIG. 3). The bores 18a, 18b terminate in the vicinity of ends 19a and 19b of the retarder, forming an angle with vertical plane I—I of the drive disc, and in control chamber 12. Control chamber 12, according to the invention, is displaced axially by an amount a (FIG. 2) relative to the retarder of the cover. Since the circumferential length of chamber 12 is also less than that of the retarder and it is designed to be symmetrical with respect to midpoint M of the retarder 19, it necessarily determines the path of bores 18a and 18b, which thereby terminate in control chamber 12 in the vicinity of ends 12a and 12b thereof. In the middle of the control chamber 12, as shown in FIG. 2, opening 21 of return channel 14 is apparent, through which the working fluid is returned to the supply chamber.

Figure 4:
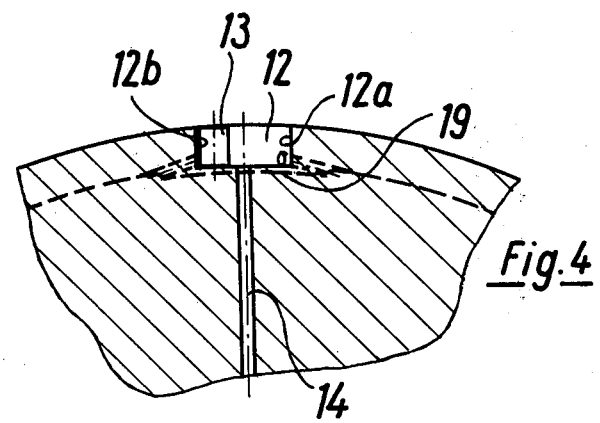
FIG. 4 is a lengthwise section along vertical plane IV—IV in FIG. 2.

A roller is provided as the control element 13, said roller being inserted in the control chamber 12, the chamber 12 being made to correspond to the diameter of the roller. The axis of roller 13 points in a radial direction (FIG. 4). The dimensions of the control chamber are set so that the roller is free to move circumferentially between ends 12a and 12b. If the drive disc, not shown in FIG. 2, moves in the direction of arrow D, control element 13 assumes the position shown in FIG. 2. This happens because the working fluid is retarded at end 19a of retarder 19 and guided through bore 18a into control chamber 12. There it works upon control element 13 in such fashion that it moves into the position shown in FIG. 2. In this position, owing to the semicircular design of ends 12a and 12b, the control element seals bore 18b. The working fluid can, thus, escape only through opening 21 into the return channel. If the rotational direction is changed, the control element 13 necessarily moves, because of the pressure now acting through bore 18b, onto the control element in the direction of end 12a, until it rests firmly against it and seals bore 18a.

The control element is not subjected to high friction, since it is in a fixed position during clutch operation and is held there without turning in a position by the pressure of the working fluid. In addition, because of the angle which the bores form with respect to vertical plane III—III, a very high percentage of the working fluid escapes from the working chamber, since the acceleration in the circumferential direction of the working fluid is utilized to force it through the bores. Therefore, it need not be brought out at a right angle from the working chamber, as in conventional designs.

In the cross section, shown in FIG. 3, through the vertical plane designated III—III in FIG. 2, the design of the retarder is apparent. It is formed as a radially inwardly-pointing projection 19 on collar 9 of the cover 5, and extends for a distance 1. In the vicinity of ends 19a and 19b, depending on the direction of rotation of drive disc 4, the working fluid builds up and is then forced into the bores. A retarder of this kind has a very simple design, works in both directions, and need not be mounted as a separate component, as is the case for other designs. It can act in both directions, without being subject to any kind of wear phenomena, since it is not subjected to friction of any kind.

FIG. 4 shows control element 13, designed as a roller, mounted with its axis pointing in the radial direction, in control chamber 12. Return channel 14 terminates in the middle of the control chamber, whereby the diameter of control element 13 is dimensioned so that, when it abuts ends 12a or 12b, it does not cover the return channel, so that provision is made for reliable escape of the working fluid from the control chamber.

Since the control element cannot abrade, and the retarder can still work reliably after a long period of time, the result is a fluid clutch wherein the return of the working fluid from the working chamber can take place very reliably and nearly completely, and even after a long period of operation. No grooves or the like need any longer be formed on the drive disc, as was the case in known designs, thus permitting a more cost-effective manufacture of the parts which cooperate to return the working fluid.

While I have shown and described the present invention, it is understood that the same is not limited to the details thereof, but is susceptible of numerous changes and modifications as known to those skilled in the art, and I, therefore, do not wish to be limited to the details shown and described herein, but intend to cover all such changes and modifications as are encompassed by the scope of the appended claims.

I clam:

1. Fluid clutch comprising a primary part with a drive disc and a secondary part with a cover, the primary and secondary parts being mounted rotatably with respect to one another, the drive disc being disposed in a working chamber formed in the secondary part, said chamber communicating through a return channel with a supply chamber formed in the secondary part, for returning clutch fluid from the working chamber to the supply chamber, retarder means for increasing the clutch fluid return pressure provided in a gap between the circumference of the drive disc and a radial boundary of the working chamber, control means disposed in a control chamber of a size corresponding to the dimensions of the control means, said chamber being displaced axially relative to the drive disc, and being located in the secondary part, two bores are provided at an angle extending radially and circumferentially relative to said drive disc and said control chamber, said bores terminating in the vicinity of the circumferential ends of the retarder means, in said gap between the drive disc and the radial boundary of the working chamber, and in said control chamber, said return channel extending from the supply chamber to the control chamber.

2. Fluid clutch according to claim 1, wherein said cover is provided with a collar, which has a radially inward surface that forms said radial boundary of the working chamber, said collar being directed axially on the cover of the secondary part.

3. Fluid clutch according to claim 1 or 2, wherein said retarder means is formed as a radially inwardly directed projection which tapers radially inwardly.

4. Fluid clutch according to claim 3, wherein the control chamber is formed symmetrically with respect to a circumferential midpoint of the retarder means, and has a length which is shorter in the circumferential direction than the retarder means.

5. Fluid clutch according to claim 1 or 2, wherein the control chamber is formed symmetrically with respect to a circumferential midpoint of the retarder means, and has a length which is shorter in the circumferential direction than the retarder means.

6. Fluid clutch according to claim 4, wherein said control means is a roller.

7. Fluid clutch according to claim 1 or 2, wherein said control means is a roller.

8. Fluid clutch according to claim 7, wherein said roller is arranged in the control chamber with its longitudinal axis directed radially with respect to the cover of the secondary part.

9. Fluid clutch according to claim 6, wherein said roller is arranged in the control chamber with its longitudinal axis directed radially with respect to the cover of the secondary part.

10. Fluid clutch according to claim 9, wherein the control chamber has a width slightly greater than the diameter of the roller.

11. Fluid clutch according to claim 1 or 2, wherein the control chamber has a width slightly greater than a diameter of the control means.

12. Fluid clutch according to claim 10, wherein circumferentially opposite ends of the control chamber are made semicircular.

13. Fluid clutch according to claim 7, wherein circumferentially opposite ends of the control chamber are made semicircular.

14. Fluid clutch according to claim 8, wherein circumferentially opposite ends of the control chamber are made semicircular.

* * * * *